US008103661B2

(12) United States Patent
Patman Maguire (10) Patent No.: US 8,103,661 B2
(45) Date of Patent: Jan. 24, 2012

(54) SEARCHING FOR A BUSINESS NAME IN A DATABASE

(75) Inventor: Frankie Elizabeth Patman Maguire, Washington, DC (US)

(73) Assignee: International Business Machines Corporation, Armonk, NY (US)

(*) Notice: Subject to any disclaimer, the term of this patent is extended or adjusted under 35 U.S.C. 154(b) by 424 days.

(21) Appl. No.: 12/339,354

(22) Filed: Dec. 19, 2008

(65) Prior Publication Data
US 2010/0161663 A1 Jun. 24, 2010

(51) Int. Cl.
*G06F 7/00* (2006.01)
*G06F 17/30* (2006.01)

(52) U.S. Cl. .......................... 707/722; 707/758; 707/769

(58) Field of Classification Search .................. None
See application file for complete search history.

(56) References Cited

U.S. PATENT DOCUMENTS

| 7,162,470 B2 | 1/2007 | Sharma et al. |
| 2004/0260677 A1 | 12/2004 | Malpani et al. |
| 2008/0091435 A1* | 4/2008 | Strope et al. .................. 704/277 |
| 2008/0215562 A1 | 9/2008 | Biesenbach et al. |

FOREIGN PATENT DOCUMENTS
WO WO 2004-044779 5/2004

OTHER PUBLICATIONS
Martin, T.P., Searching and Smushing on the Semantic Web—Challenges for Soft Computing, Studies in Fuzziness and Soft Computing, 2004, p. 167-186.*

* cited by examiner

*Primary Examiner* — Jay Morrison
(74) *Attorney, Agent, or Firm* — Toler Law Group (57) ABSTRACT

A method includes receiving a search query that includes the input search string. The input search string includes a plurality of terms. The method includes performing a first comparison task to compare each of the plurality of terms to a list of category terms. The method also includes identifying a matched term as a category term when there is a match with respect to the first comparison task. The method includes identifying each of the plurality of terms that have not been identified as a category term to produce a set of naming terms. The method also includes filtering a database having a plurality of database entries based on each of the identified category terms to identify a reduced set of database entries. The method includes comparing at least one of the naming terms to the reduced set of database entries to identify at least one matching name.

25 Claims, 7 Drawing Sheets

SEARCHING FOR A BUSINESS NAME IN A DATABASE

I. FIELD

The present disclosure is generally related to searching for a business name in a database.

II. BACKGROUND

Searching for a name of a business in a database may be a slow process when the name of the business has a large number of words, since each word in the business name is typically compared to each word of each business name stored in the database. In addition, the business name may contain one or more words that are commonly used in a business name. For example, the business name may have words describing a category of the business, such as "dry cleaners", "bank", or "pizza". The business name may also contain a geographical reference, such as the name of the city or state in which the business is located. For example, in the city of Miami, business names may contain a reference to the city or state, such as "Miami Roofing", "Miami Tile", or "Florida Roofing". When a business name contains one or more words that are common to many businesses, searching for a match in the database for such names may be slow because of the extra searching for words common to many business names.

III. BRIEF SUMMARY

A system and method to search for a business name in a database is disclosed. In a particular embodiment, the method includes receiving a search query that includes an input search string that includes a plurality of terms. The method includes performing a first comparison task to compare each of the plurality of terms to a list of category terms. Upon a match with respect to the first comparison task, the method includes identifying a matched term as a category term. The method also includes identifying each of the plurality of terms that have not been identified as a category term to produce a set of naming terms. The method further includes filtering a database having a plurality of database entries based on each of the identified category terms to identify a reduced set of database entries. The method includes comparing at least one of the naming terms to the reduced set of database entries to identify at least one matching name.

In another particular embodiment, the method includes receiving a search query that includes an input search string. The input search string includes a plurality of terms including a first term, a second term, and a third term. The method also includes performing a first comparison task to compare each of the plurality of terms to a list of category terms and upon a match with respect to the first comparison task, identifying a matched term as a category term. The method also includes performing a second comparison task to compare at least some of the plurality of terms to a list of legal status terms and upon a match with respect to the second comparison task, identifying a matched term as a legal status term. The method also includes identifying each of the plurality of terms that have not been identified as a category term or as a legal status term to produce a set of naming terms. The method includes filtering a database based on each of the identified category terms to produce a set of entries. The set of entries is associated with the category terms or has no category association. The method also includes comparing each naming term of the set of naming terms to each of the set of entries to generate a set of matching scores. The method includes modifying each score of the set of matching scores based on a comparison of each legal status term of the set of legal status terms to each of the set of entries to produce a set of modified scores. The method also includes identifying at least a portion of the set of entries based on the modified scores to produce a set of output entries. The method includes storing the output entries and providing the output entries as a report.

V. DETAILED DESCRIPTION

Figure 1:
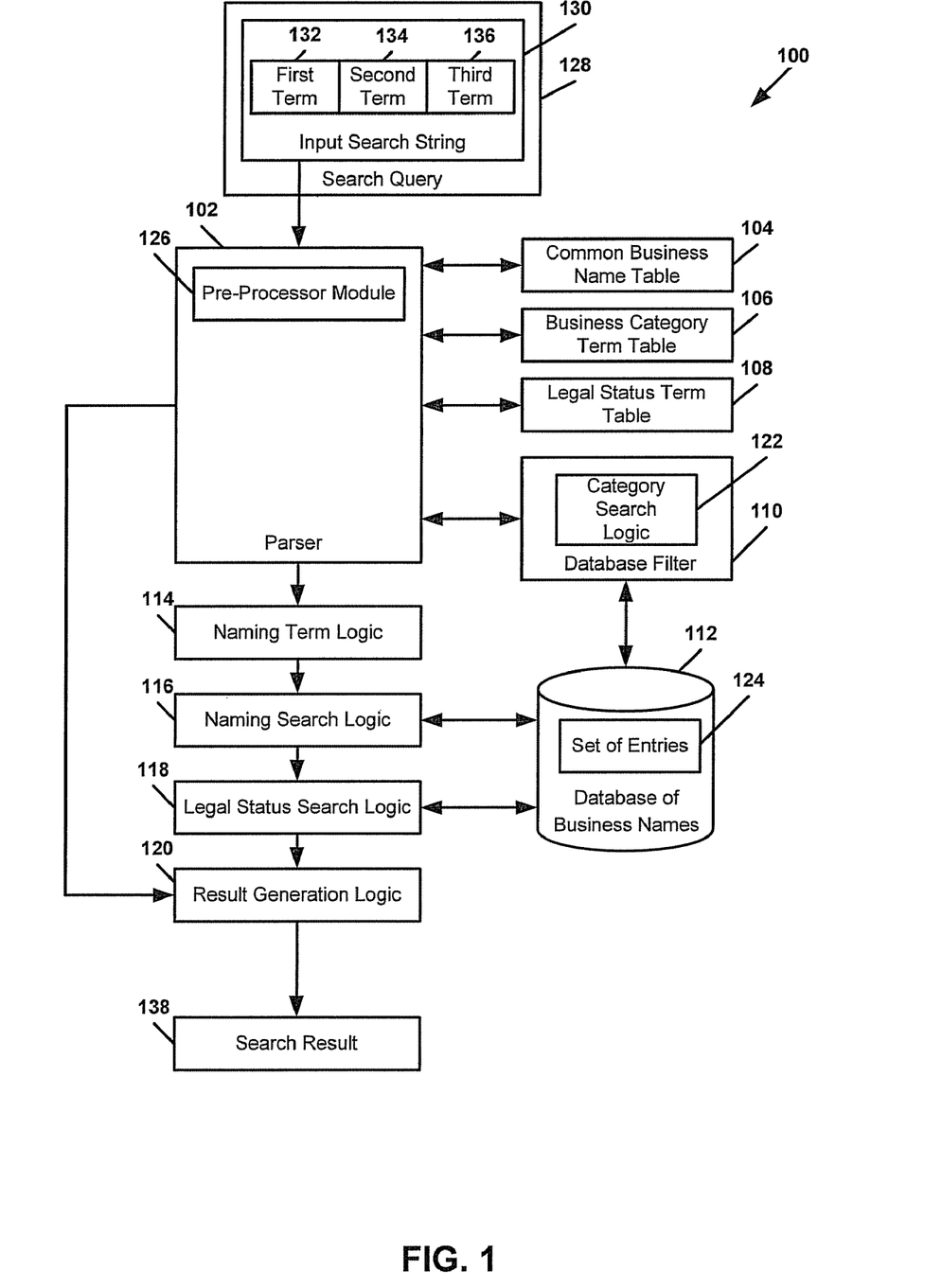
FIG. 1 is a block diagram of a first embodiment of a system to search for a business name in a database of business names.

FIG. 1 is a block diagram of a first embodiment of a system 100 to search for a business name in a database of business names. The system 100 includes a parser 102, a common business name table 104, a business category term table 106, a legal status term table 108, a database filter 110, a database of business names 112, naming term logic 114, naming search logic 116, legal status search logic 118, and result generation logic 120. The database filter 110 includes category search logic 122. The database of business names 124 includes a set of entries 124.

The parser 102 is configured to receive a search query 128 that includes an input search string 130. The input search string 130 includes a plurality of terms including a first term 132, a second term 134, and a third term 136. In an illustrative embodiment, the input search string 130 is the name of a business, such as "Bank of Quality, Inc.", which includes a business name "Quality", a business category "Bank", and a legal status "Inc." The parser 102 includes a pre-processor module 126 configured to compare the terms 132, 134 and 136 to the common business names table 104 and to identify when the terms 132, 134, and 136 substantially match an entry of the common business names table 104. The parser 102 may be configured to perform a first comparison task to compare each of terms 132, 134, and 136 of the input search string 130 to a list of category terms in the business category term table 106 and upon a match with respect to the first comparison task, identify a matched term as a category term. The parser 102 may be configured to search the input search string 130 for a category term in the input search string 130 and for a legal status term in the input search string 130. The parser 102 may be configured to parse the input search string 130 to identify each of the terms 132, 134 and 136 of the input search string 130 as a category term, a naming term, or a legal status term. The parser 102 may compare the terms 132, 134 and 136 to the entries of the common business name table 104 to determine whether to perform a search of entries in the database of business names 112. The parser 102 may compare at least the terms 132, 134, and 136 to entries of the business category term table 106. The parser 102 may compare at least the terms 132, 134 and 136 to the legal status term table 108 that includes a list of terms associated with a legal status.

The category search logic 122 is operative to select the set of entries 124 of the database of business names 124 to be searched by comparing a business category indicator to a particular business category corresponding to the category term. The category search logic 122 is configured to apply a first search technique to any category terms identified in the input search string 130. The first search technique removes from the set of entries 124 any of the entries having a category that conflicts with a category term of the input search string 130. The first search technique includes selecting a numerical category indicator associated with the category term of the business name and performing a comparison of the selected numerical category indicator with a numerical category indicator of an entry of the database of business names 112. The first search technique is performed without accessing Standard Industry Classification data. Each of the terms 132, 134, and 136 affect the first search result. The category search logic 122 is configured to perform a first comparison task to compare each of the plurality of terms 132, 134, and 136 to category terms in the business category term table 106, and upon a match with respect to the first comparison task, to identify a matched term as a category term. The database filter 110 is configured to filter the database of business names 112 based on each of the identified category terms to identify the reduced set of entries 124 by comparing naming terms when a category term matches a category term of a database entry.

The naming search logic 116 is operative to apply a second search technique to any naming terms identified in the input search string 130. The second search technique compares each of the naming terms identified in the business name to each naming term of a stored business name of an entry of the database of business names 112 and generates a score based on the comparison. The naming search logic 116 compares at least one of the naming terms to the reduced set of entries 124 to identify at least one matching name.

The legal status search logic 118 is operative to apply a third search technique to any legal status terms identified in the input search string 130. The third search technique includes adjusting a score that is associated with a similarity between naming terms of the business name and naming terms of a stored business name of an entry of the database of business names 112. The score is adjusted based on comparing a legal status associated with the database entry with a legal status indicated by the legal status terms of the input search string 130. The legal status search logic 118 is configured to compare at least some of the plurality of terms to a list of legal status terms and upon a match, to identify a matched term as a legal status term. The legal status search logic 118 is configured to identify each of the plurality of terms that have not been identified as a category term or as a legal status term to produce a set of naming terms.

In operation, the parser 102 receives the input search string 130 that includes the terms 132, 134, and 136. For example, the input search string 130 may be the name of a business, such as "Bank of Quality, Inc.", in which, the first term 132 is the business name "Quality", the second term is the business category "Bank", and the third term is the legal status "Inc." The pre-processor module 126 identifies which of the terms 132, 134, and 136 includes the business name and then determines whether the business name is in the common business name table 104. The common business name table 104 includes the names of well known businesses, such as Microsoft, IBM, Kodak, Xerox, and Citibank. When any of the terms 132, 134, or 136 closely matches an entry of the common business name table 104, the parser 102 passes the input search string 130 to the result generation logic 120 to generate a result indicating that the input search string 130 includes a common business name.

When any of the terms 132, 134, or 136 do not closely match an entry of the common business name table 104, the parser 102 determines whether any of the terms 132, 134, or 136 includes a business category term using the business category term table 106. When any of the terms 132, 134, and 136 includes a business category term, the database filter 110 searches those entries in the database of business names 112 that have the same business category term. For example, when the second term 134 includes the category term "Bank", then only those entries in the database of business names 112 that have the business category term "Bank" are searched to determine whether an entry of the database of business names 112 matches the first term 132 or the third term 136. When the business category term of the input search string 130 does not match an entry in the database of business names 112 that has the same business category term, then the database filter 110 searches those entries in the database of business names 112 that do not have a business category term. When at least two of the terms 132, 134, and 136 match an entry in the database of business names 112, the parser 102 sends the results of the search to the result generation logic 120.

The parser 102 also determines whether at least one of the terms 132, 134, and 136 includes a legal status term using the legal status term table 108. For example, when one of the terms 132, 134, and 136 matches an entry in the business category term table. 106, the remaining terms are compared to the legal status term of the matching entries. The search result 138 may be adjusted based on whether a legal status term is present in one of the matching entries but not in another matching entry or when one of the terms 132, 134, and 136 is a legal status term that is different than a legal status in the legal status term table 108. For example, the names "J. L. Mencken Consulting, LLC" and "J Mencken Consulting, Inc." have a matching category term, "consulting," and have matching naming terms "J" and "Mencken." The result generation logic 120 may create a search result 138 based on the two names having different legal status terms, i.e. "LLC" and "Inc." When the parser 102 determines that the terms 132, 134, and 136 include a legal status term, the database filter 112 searches those entries in the database of business names 112 that have the same legal status term to determine whether the remaining terms in the input search string 130 match an entry in the database of business names 112.

When one of the terms 132, 134, and 136 matches an entry in the business category table 106, the database of business names 112 may be searched to determine whether the remaining terms match an entry in the database of business names 112. In a first particular embodiment, the category search logic 122 first identifies the entries in the database of business names having a similar category as the matching term, and then the naming search logic 116 and the legal status search logic 118 perform a search on the identified entries.

In a second particular embodiment, the category search logic 122 identifies an entry in the database of business names 112 having a similar category as the matching term. The naming search logic 116 and the legal status search logic 118 determine if a portion of the entry matches a term in the input search string 130. The category search logic 122 identifies the next entry in the database of business names 112 having a similar category as the matching term, and so on, until all entries having a similar category have been identified.

In a particular embodiment, the parser 102 compares the input search string 128 to the business names stored in the database of business names 112. The parser 102 receives a search query 128 that includes the input search string 130. The input search string 103 includes a plurality of terms, the terms 132, 134, and 136. The pre-processor module 126 compares each of the terms 132, 134, and 136 to a list of category terms of the business category term table 106. For each of the terms 132, 134, and 136 matching a category term of the business category term table 106, the pre-processor module 126 identifies the matching term as a category term. For each of the terms 132, 134, and 136 not matching a category term of the business category term table 106, the pre-processor module 126 identifies the non-matching term as a naming term. The database filter 110 filters the business names based on each identified category term to produce a reduced set of business names, such as the set of entries 124. The naming search logic 116 compares at least one identified naming term to the set of entries 124 to identify at least one matching name of the set of entries 124.

By identifying one or more of the terms of the input search string 130 as a common business name, or a business category the entire database of business names 112 does not have to be searched to determine whether an entry in the database of business names 112 matches a portion of the terms of the input search string 130. Thus, by using the system 100, searching for a business name in a large database is both faster and more accurate.

Figure 2:
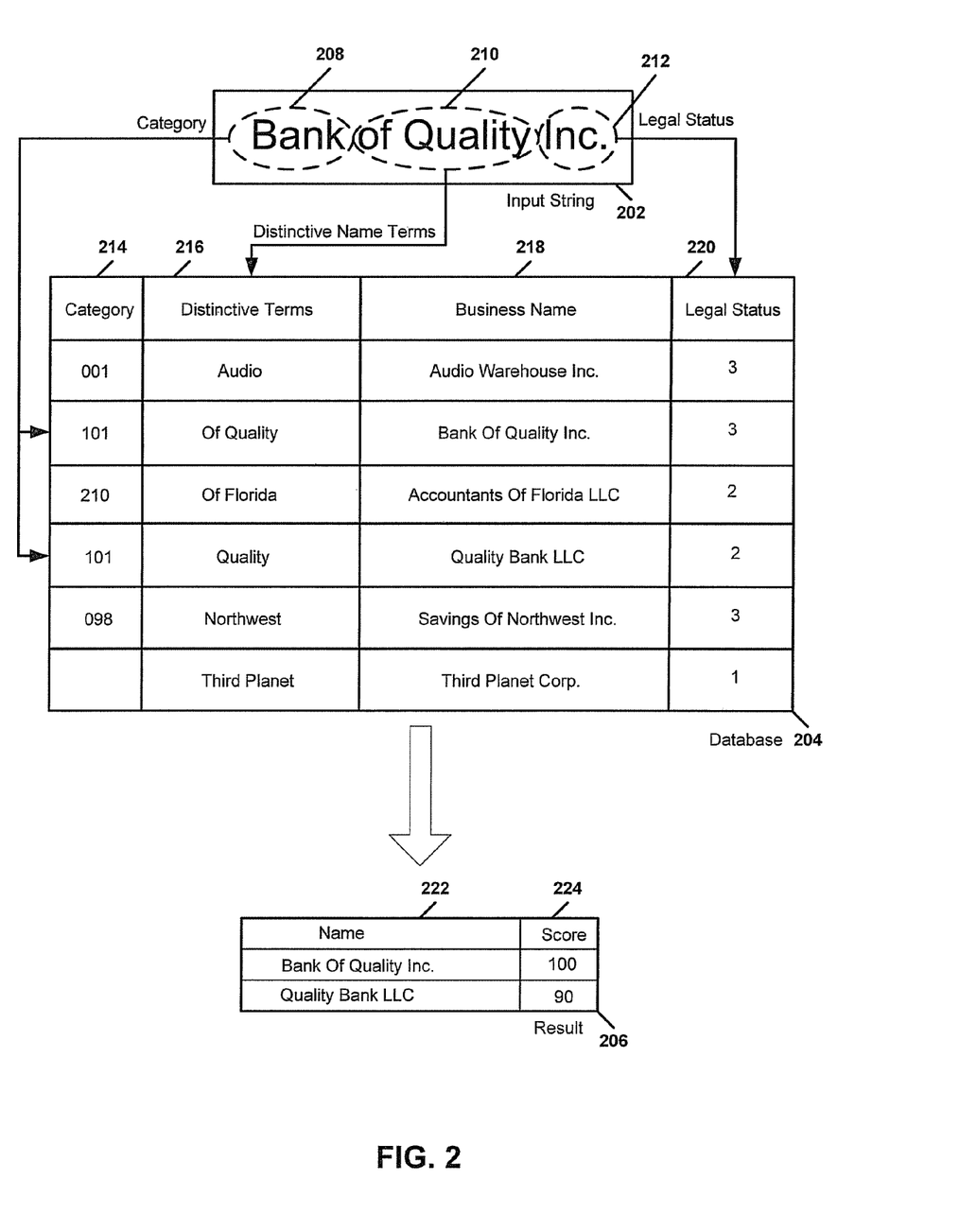
FIG. 2 is an illustrative embodiment of identifying a business name in a database of business names.

FIG. 2 is an illustrative embodiment of identifying a business name in a database of business names. FIG. 2 includes an input string 202, a database 204, and a result 206. The input string 202 includes a category term 208, distinctive name terms 210, and a legal status term 212. Each entry in the database 204 has an associated category 214, distinctive terms 216, business name 218, and legal status 220. Each entry in the result 206 has a name 222 and a score 224.

The input string 202 is parsed to identify the category 208, the distinctive name terms 210, and the legal status 212, which may be referred to as a first term, a second term, and a third term of the input string 202, respectively. The category 208 identifies a type of the business in the business name. In a particular embodiment, each type of category is associated with a numerical identifier and the associated numerical identifier is stored in the database 204. For example, in FIG. 2, the category "Audio" is associated with the numerical identifier 001, the category "Accountants" is associated with the numerical identifier 210, and the category "Savings" is associated with the numerical identifier 098. The numerical identifier 101 is assigned to two entries in the database 204 because the category term "Bank" is common to two names in the database 204. In a particular embodiment, the naming elements "Of Quality" and "Quality" are both associated with the numerical identifier 101. In FIG. 2, "Third" and "Planet" are not defined as categories and therefore have no associated numerical identifier.

The legal status 212 identifies a status of the business based on the business name. In a particular embodiment, each type of legal status is associated with a numerical identifier and the associated numerical identifier is stored in the database 204. For example, in FIG. 2, the legal status "Corp." is associated with the numerical identifier 1, the legal status "LLC" is associated with the numerical identifier 2, and the legal status "Inc." is associated with the numerical identifier 1. In a particular embodiment, different forms of the same legal status, such as "Corp." and "Corporation", are assigned the same numerical identifier. In another particular embodiment, each form of the same legal status is assigned a different numerical identifier.

The distinctive name terms 210 of the input string 202 constitute the portion of the business name that is not identified as the category 208 or as the legal status 212. When the category 214 or the legal status 212 match the corresponding field of an entry of the database 204, the business name 218 is placed in the result 206 and a numerical score related to how closely the input string 202 matches the database entry is placed in the score field 224. In an illustrative embodiment, the score 224 is expressed as a percentage. In FIG. 2, the database entry "Bank of Quality Inc." has a 100% score, indicating that the database entry matches the input string 202. The database entry "Quality Bank LLC" has a 90% score, indicating that the category 208, the distinctive name terms 210, and the input string 212 match a portion of a database entry. In FIG. 2, "Bank of Quality Inc." has the same category but a different legal status than the database entry "Quality Bank LLC"

Figure 3:
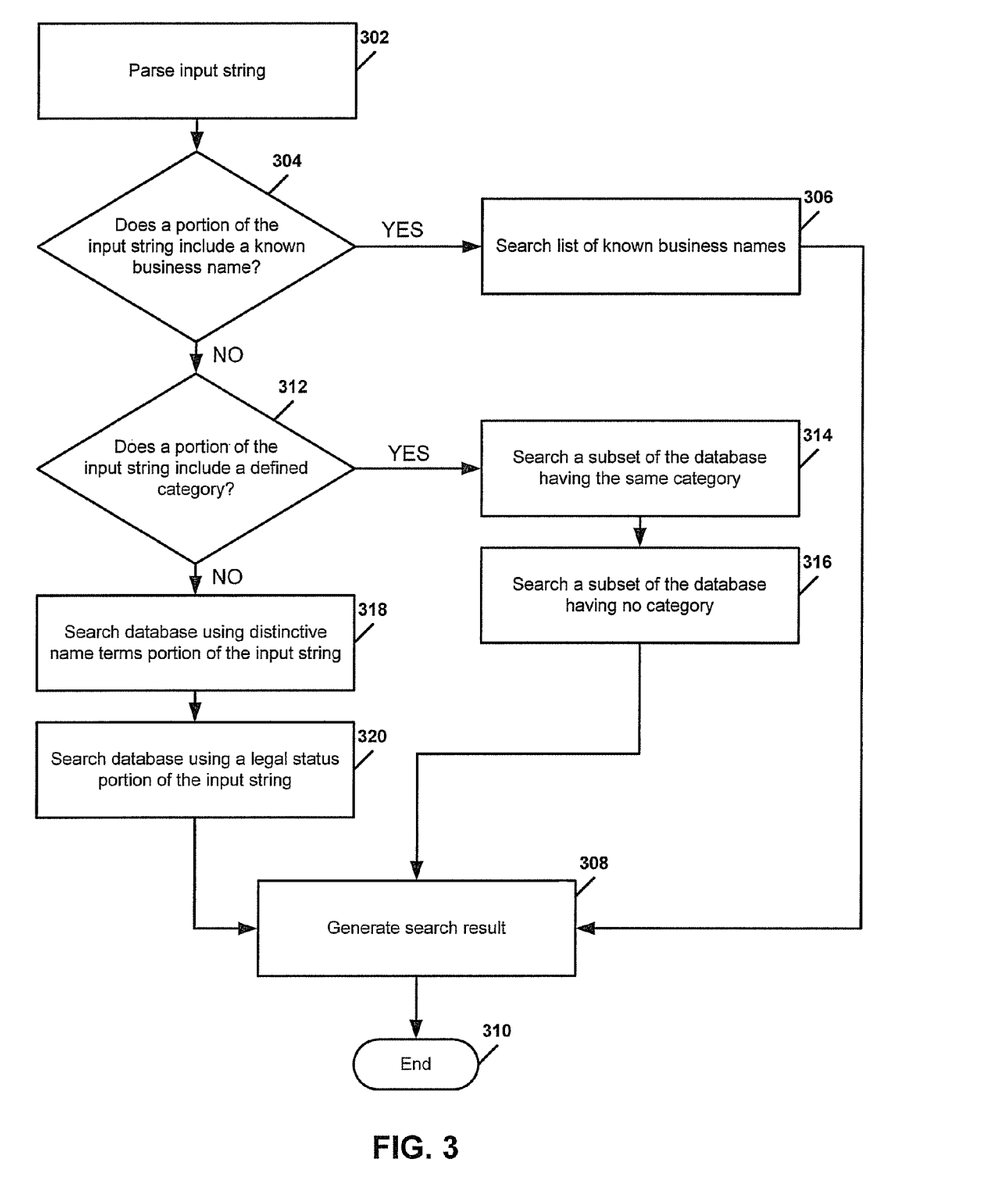
FIG. 3 is a flow diagram of a first illustrative embodiment of a method to search for a business name in a database of business names.

FIG. 3 is a flow diagram of a first illustrative embodiment of a method to search for a business name in a database of business names. The method may be performed by a parser, such as the parser 102, as shown in FIG. 1.

The input string is parsed, at 302. The input string may include a plurality of terms, such as the terms 132, 134, and 136 in FIG. 1. A determination is made whether a portion of the input string includes a known business name, at 304. When a portion of the input string includes a known business name, at 304, a list of known business names is searched, at 306, and the method proceeds to 308. For example, the list of known business names may be the common business name table 104, as shown in FIG. 1. A search result is generated, at 308, and the method ends, at 310.

When a portion of the input string does not include a known business name, at 304, a determination is made whether a portion of the input string includes a defined category, at 312. For example, a portion of the input string may be compared to each entry in the business category term table 106, as shown in FIG. 1. When a portion of the input string includes a defined category, at 312, a subset of the database having the same category is searched, at 314. Continuing to 316, a subset of the database having no category is searched. Proceeding to 308, a search result is generated, and the method ends, at 310.

When a portion of the input string does not include a defined category, at 312, the database is searched using a distinctive name terms portion of the input string, at 318. Advancing to 320, the database is searched using a legal status portion of the input string. For example, whether the legal status portion of the input string matches one or more entries may be used to further refine a comparison of names that contain matching category and/or naming elements. Proceeding to 308, a search result is generated, and the method ends, at 310.

Figure 4:
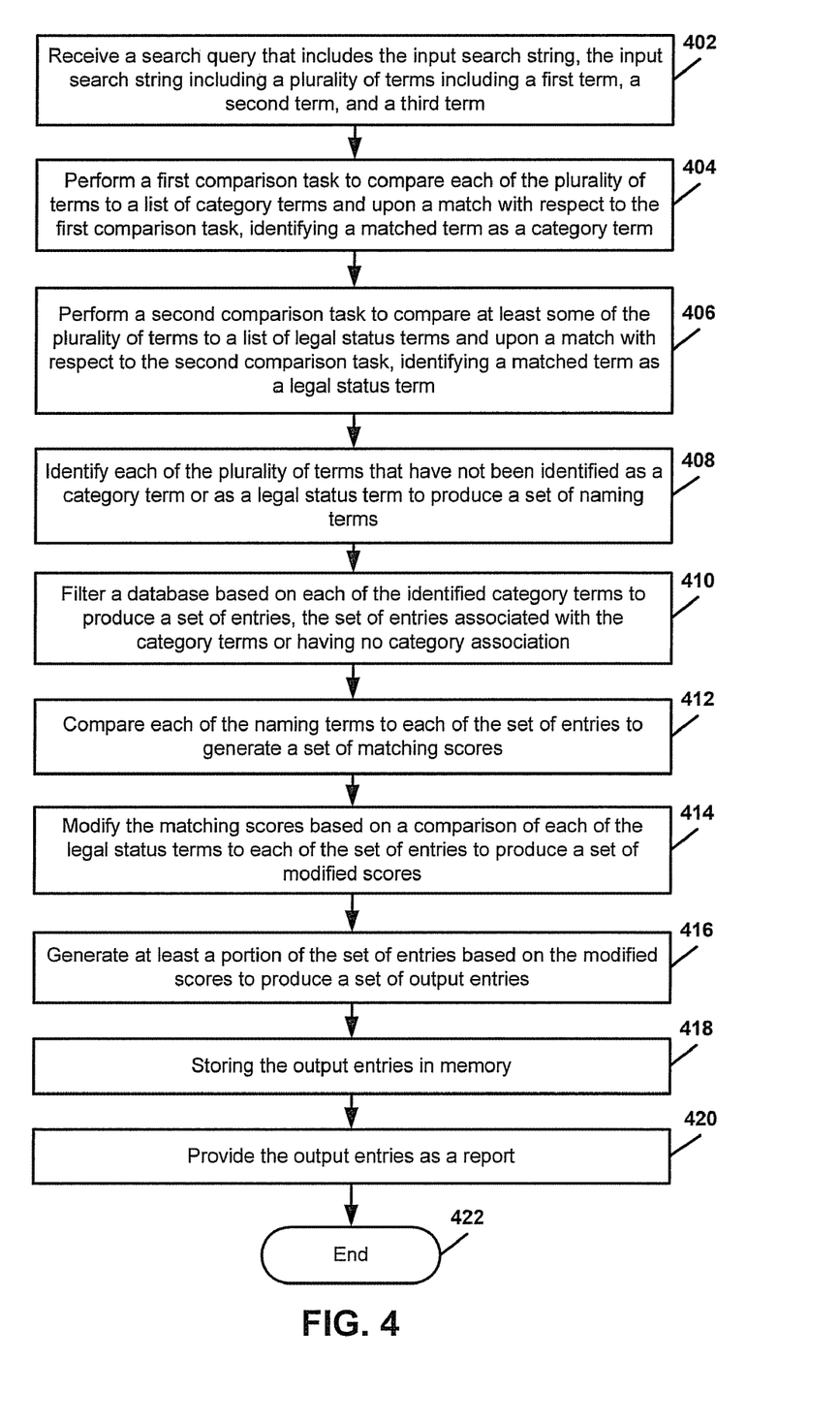
FIG. 4 is a flow diagram of a second illustrative embodiment of a method to search for a business name in a database of business names.

FIG. 4 is a flow diagram of a second illustrative embodiment of a method to search for a business name in a database of business names. The method may be performed by the parser 102, as shown in FIG. 1.

The method begins at 402, when a search query is received that includes the input search string. The input search string includes a plurality of terms, including a first term, a second term, and a third term, such as the terms 132, 134, and 136, as shown in FIG. 1. Proceeding to 404, a first comparison task is performed to compare each of the plurality of terms to a list of category terms. Upon a match with respect to the first comparison task, a matched term is identified as a category term. For example, the first comparison task may compare the first term 132, the second term 134, and the third term 136 with one or more entries of the business category term table 106, as shown in FIG. 1.

Continuing to 406, a second comparison task is performed to compare at least some of the plurality of terms to a list of legal status terms. Upon a match with respect to the second comparison task, a matched term is identified as a legal status term. For example, the second comparison task may compare the first term 132, the second term 134, and the third term 136 with one or more entries of the legal status term table 108, as shown in FIG. 1. Advancing to 408, each of the plurality of terms that have not been identified as a category term or as a legal status term are identified to produce a set of naming terms. For example, the set of naming terms may be the distinctive name terms 210, as shown in FIG. 2. Moving to 410, a database is filtered based on each of the identified category terms to produce a set of entries. The set of entries are associated with the category terms or have no category association. Proceeding to 412, each of the naming terms is compared to each of the set of entries to generate a set of matching scores.

Continuing to 414, the matching scores are modified based on a comparison of each of the legal status terms to each of the set of entries to produce a set of modified scores. Moving to 416, at least a portion of the set of entries is generated based on the modified scores to produce a set of output entries. Proceeding to 418, the output entries are stored in memory. Advancing to 420, the output entries are provided as a report. The method ends, at 422.

Figure 5:
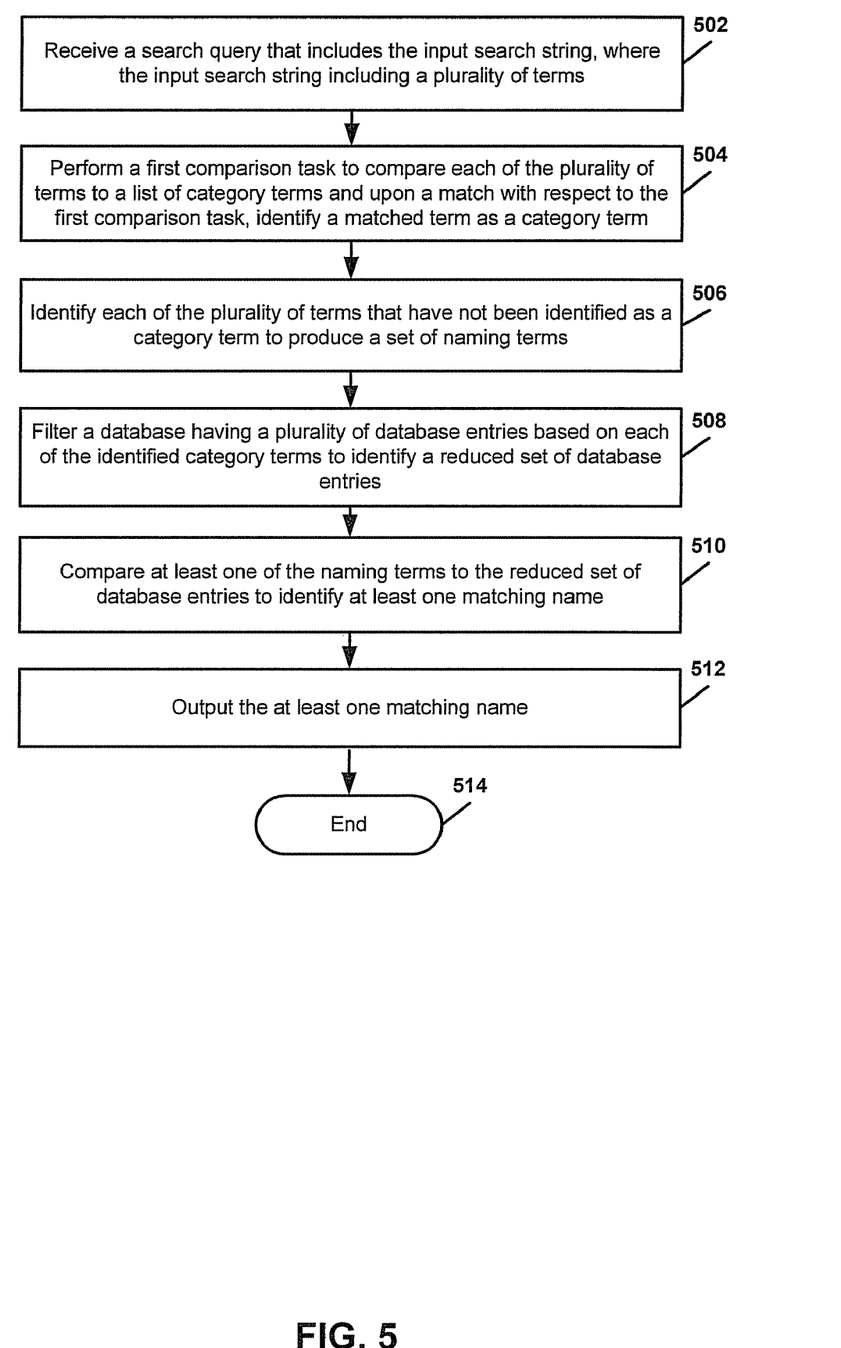
FIG. 5 is a flow diagram of a third illustrative embodiment of a method to search for a business name in a database of business names.

FIG. 5 is a flow diagram of a third illustrative embodiment of a method to search for a business name in a database of business names. The method may be performed by a parser, such as the parser 102, as shown in FIG. 1.

A search query that includes the input search string is received at 502. The input search string includes a plurality of terms. For example, the plurality of terms may be the first term 132, the second term 134, and the third term 136, as shown in FIG. 1. Moving to 504, a first comparison task is performed to compare each of the plurality of terms to a list of category terms. Upon a match with respect to the first comparison task, a matched term is identified as a category term. For example, the terms 132, 134, and 136 may be compared to the entries of the business category term table 106, as shown in FIG. 1.

Proceeding to 506, each of the plurality of terms that have not been identified as a category term are identified to produce a set of naming terms. For example, the set of naming terms may be the distinctive name terms 210, as shown in FIG. 2. Advancing to 508, a database having a plurality of database entries is filtered based on each of the identified category terms to identify a reduced set of database entries. Continuing to 510, at least one of the naming terms is compared to the reduced set of database entries to identify at least one matching name. Moving to 512, the at least one matching name is output. The method ends at 514.

Figure 6:
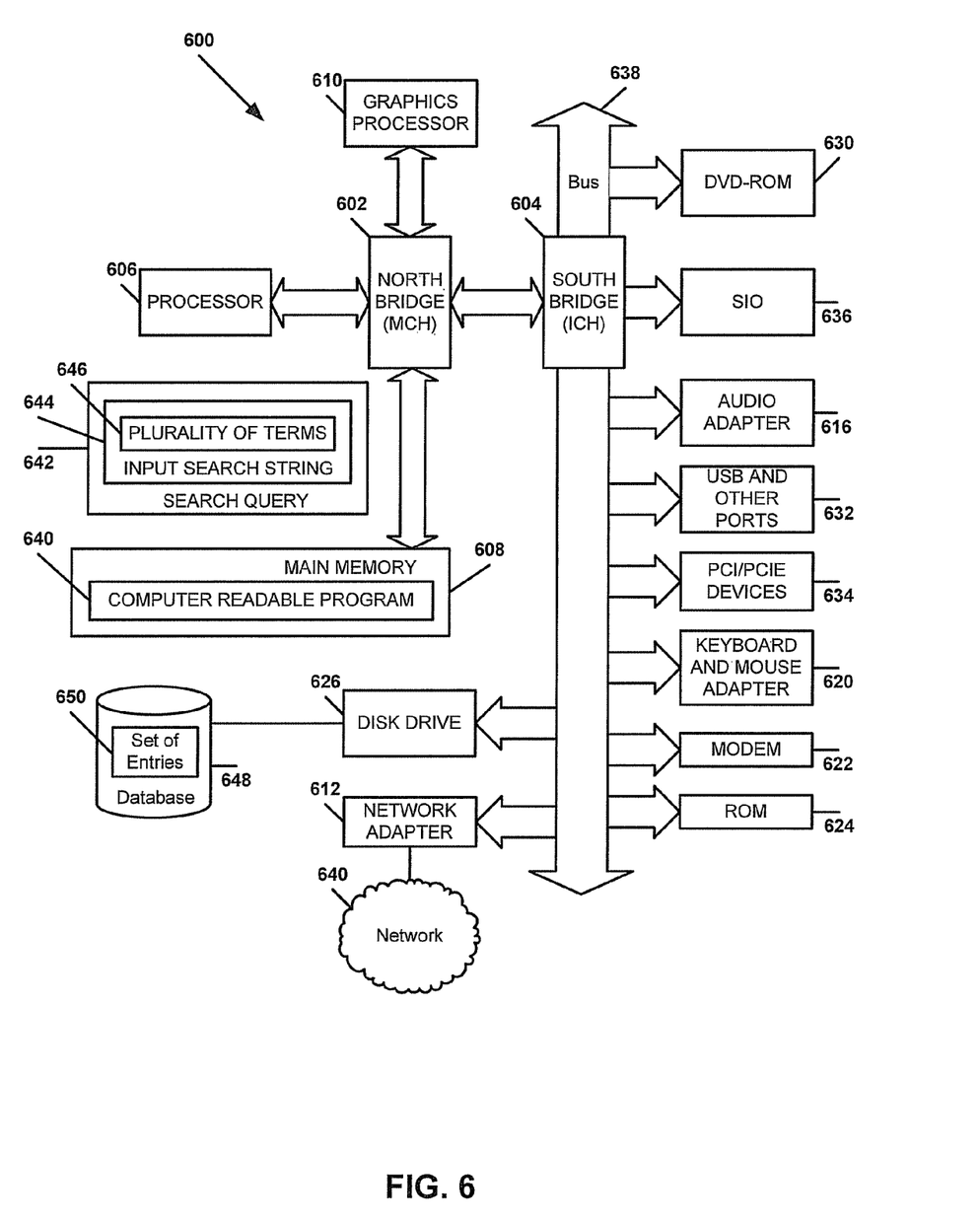
FIG. 6 is a block diagram of a computing system in which systems and methods of the present disclosure may be implemented.

FIG. 6 is a block diagram of a computing system in which systems and methods of the present disclosure may be implemented. Computing system 600 includes an example of a server, such as the system 100 in FIG. 1, in which computer usable code or instructions are executable to implement the various components, such as the parser 126 and the database filter 110, may be implemented.

In the depicted example, the computing system 600 employs a hub architecture including a north bridge and memory controller hub (MCH) 602 and a south bridge and input/output (I/O) controller hub (ICH) 604. A processor 606, a main memory 608, and a graphics processor 610 are coupled to the north bridge and memory controller hub 602. For example, the graphics processor 610 may be coupled to the MCH 602 through an accelerated graphics port (AGP) (not shown).

In the depicted example, a network adapter 612 is coupled to the south bridge and I/O controller hub 604 and an audio adapter 616, a keyboard and mouse adapter 620, a modem 622, a read only memory (ROM) 624, universal serial bus (USB) ports and other communications ports 632, and Peripheral Component Interconnect (PCI) and Peripheral Component Interconnect Express (PCIe) devices 634 are coupled to the south bridge and I/O controller hub 604 via bus 638. A disk drive 626 and a DVD-ROM drive 630 are coupled to the south bridge and I/O controller hub 604 through the bus 638. The DVD-ROM drive 630 may be capable of reading various optical media, including compact disc (CD), and digital versatile disc (DVD). The PCI/PCIe devices 634 may include, for example, Ethernet adapters, add-in cards, and PC cards for notebook computers. The ROM 624 may be, for example, a flash binary input/output system (BIOS). The disk drive 626 and the DVD-ROM drive 630 may use, for example, an integrated drive electronics (IDE) or serial advanced technology attachment (SATA) interface. A super I/O (SIO) device 636 may be coupled to the south bridge and I/O controller hub 604. A network 640 may be coupled to the network adapter 612.

The main memory 608 includes a computer readable program 640, that when executed by the computer system 600, causes the computer system 600 to receive a search query 642 that includes an input search string 644. The input search string 644 includes a plurality of terms 646. The computer readable program 640 is further executed to perform a first comparison task to compare each of the plurality of terms 646 to a list of category terms and upon a match with respect to the first comparison task, identify a matched term as a category term. The computer readable program 640 is further executed to identify each of the plurality of terms 646 that have not been identified as a category term to produce a set of naming terms. The computer readable program 640 is further executed to filter a database 648 having a plurality of database entries 650 based on each of the identified category terms to identify a reduced set of database entries. The computer readable program 640 is further executed to compare at least one of the naming terms to the reduced set of database entries to identify at least one matching name, wherein the at least one matching name is not an address, phone number, postal code, location, area code, account number, or Standard Industry Classification (SIC) code.

An operating system (not shown) runs on the processor 606 and coordinates and provides control of various components within the computing system 600. The operating system may be a commercially available operating system such as Microsoft® Windows® XP (Microsoft and Windows are trademarks of Microsoft Corporation in the United States, other countries, or both). An object oriented programming system, such as the Java® programming system, may run in conjunction with the operating system and provide calls to the operating system from Java programs or applications executing on computing system 600 (Java and all Java-based trademarks are trademarks of Sun Microsystems, Inc. in the United States, other countries, or both).

Instructions for the operating system, the object-oriented programming system, and applications or programs are located on storage devices, such as the hard disk drive 626, and may be loaded into the main memory 608 for execution by the processor 606. The processes of the disclosed illustrative embodiments may be performed by the processor 606 using computer implemented instructions, which may be located in a memory such as, for example, the main memory 608, the read only memory 624, or in one or more of the peripheral devices.

The hardware in computing system 600 may vary depending on the implementation. Other internal hardware or peripheral devices, such as flash memory, equivalent non-volatile memory, or optical disk drives and the like, may be used in addition to or in place of the hardware depicted in FIG. 6. Also, the processes of the disclosed illustrative embodiments may be applied to a multiprocessor data processing system.

In some illustrative examples, portions of the computing system 600 may be implemented in a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, the main memory 608 or a cache such as found in the north bridge and memory controller hub 602. A server may include one or more processors or CPUs. The depicted examples in FIG. 6 and above-described examples are not meant to imply architectural limitations. For example, portions of the computing system 600 also may be implemented in a tablet computer, laptop computer, or telephone device in addition to taking the form of a PDA.

Particular embodiments of the computing system 600 can take the form of an entirely hardware embodiment, an entirely software embodiment or an embodiment containing both hardware and software elements. In a particular embodiment, the disclosed methods are implemented in software, which includes but is not limited to firmware, resident software, microcode, etc.

Figure 7:
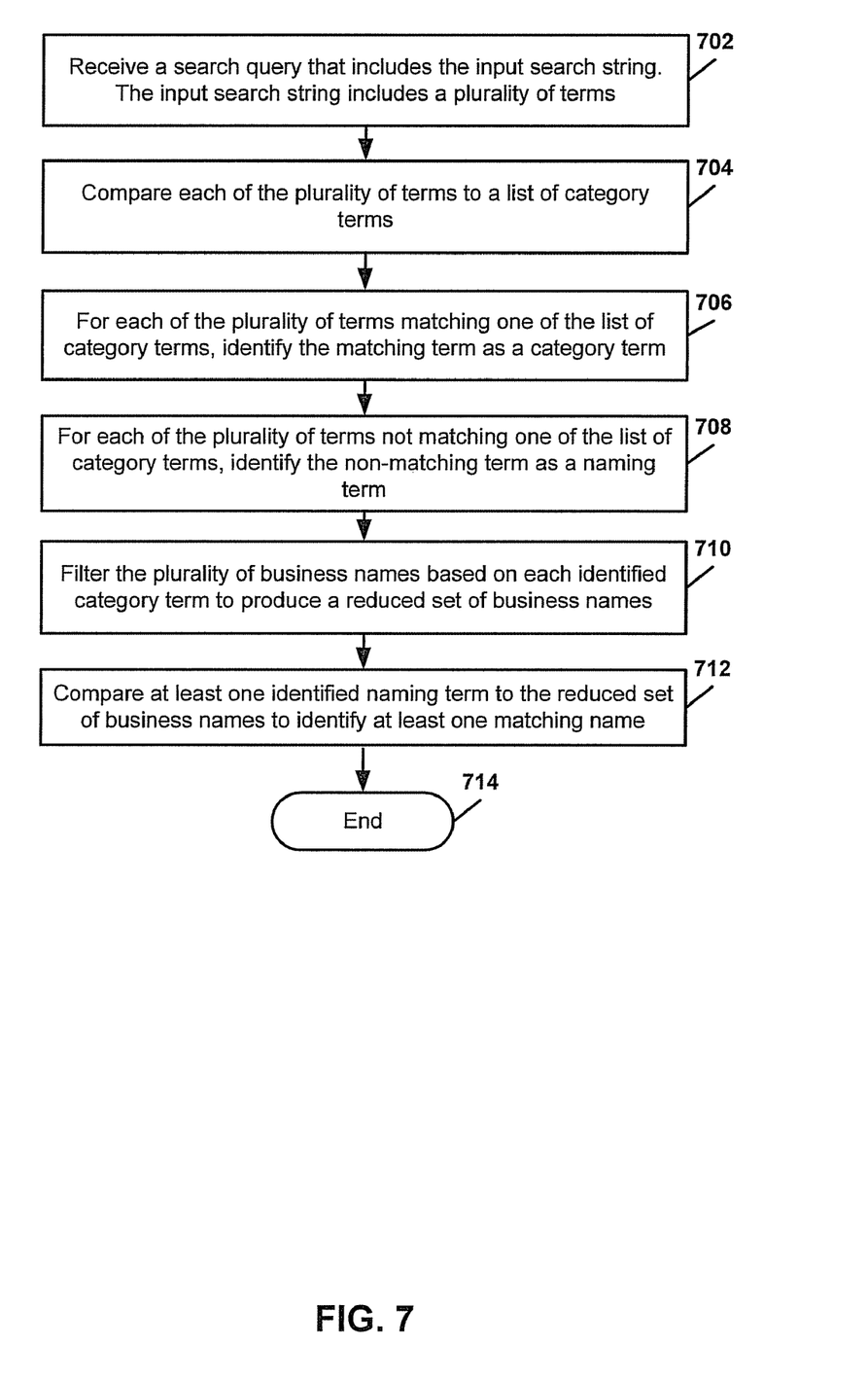
FIG. 7 is a flow diagram of a fourth illustrative embodiment of a method to search for a business name in a database of business names.

FIG. 7 is a flow diagram of a fourth illustrative embodiment of a method to search for a business name in a database of business names. The method may be performed by a parser, such as the parser 102, as shown in FIG. 1.

At 702, a search query that includes the input search string is received. The input search string including a plurality of terms. Moving to 704, each of the plurality of terms are compared to a list of category terms. Advancing to 706, for each of the plurality of terms matching one of the list of category terms, the matching term is identified as a category term. Continuing to 708, for each of the plurality of terms not matching one of the list of category terms, the non-matching term is identified as a naming term. Proceeding to 710, the plurality of business names are filtered based on each identified category term to produce a reduced set of business names. Moving to 712, at least one identified naming term is compared to the reduced set of business names to identify at least one matching name. The method ends at 714.

Further, embodiments of the present disclosure, such as the one or more embodiments in FIGS. 1-7, can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and digital versatile disk (DVD).

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the data processing system either directly or through intervening I/O controllers.

Network adapters may also be coupled to the data processing system to enable the data processing system to become coupled to other data processing systems or remote printers or storage devices through intervening private or public networks. Modems, cable modems, and Ethernet cards are just a few of the currently available types of network adapters.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electro-magnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc. Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The previous description of the disclosed embodiments is provided to enable any person skilled in the art to make or use the disclosed embodiments. Various modifications to these embodiments will be readily apparent to those skilled in the art, and the generic principles defined herein may be applied to other embodiments without departing from the scope of the disclosure. Thus, the present disclosure is not intended to be limited to the embodiments shown herein but is to be accorded the widest scope possible consistent with the principles and features as defined by the following claims.

The invention claimed is:

1. A method of comparing an input search string to a plurality of stored business names, the method comprising:
    receiving a search query that includes the input search string, the input search string including a plurality of terms;
    performing a first search technique to compare each of the plurality of terms to a list of category terms;
    for each of the plurality of terms matching an item in the list of category terms, identifying the matching term as a category term;
    performing a second search technique to generate a list of legal status terms based on the plurality of terms and to compare each of the plurality of terms to the list of legal status terms;
    for each of the plurality of terms matching an item in the list of legal status terms, identifying the matching term as a legal status term;
    for each of the plurality of terms not matching any item in the list of category terms or in the list of legal status terms, identifying the non-matching term as a naming term;
    filtering the plurality of stored business names based on at least one of each identified category term, legal status term, and naming term to produce a reduced set of business names.

2. The method of claim 1, further comprising using legal status search logic to match at least one of the plurality of terms to the list of legal status terms.

3. The method of claim 1, wherein the list of category terms includes commonly used business name terms that indicate a particular category of business, the commonly used business name terms not generated based on Standard Industry Classification (SIC) codes.

4. The method of claim 1, wherein filtering the plurality of stored business names comprises numerically comparing each identified category term to a category term associated with each of the plurality of stored business names.

5. The method of claim 1, wherein the matching name is not an address, phone number, postal code, location, area code, account number, or Standard Industry Classification (SIC) code.

6. The method of claim 1, further comprising filtering a database based on each of the identified category terms to produce a set of entries, the set of entries associated with the identified category terms or having no category association.

7. The method of claim 6, further comprising comparing each identified naming term to each entry of the set of entries to generate a set of matching scores.

8. The method of claim 7, further comprising modifying each matching score of the set of matching scores based on a comparison of each legal status term of a the list of legal status terms to each entry of the set of entries to produce a set of modified scores.

9. The method of claim 8, further comprising:
identifying at least a portion of the set of entries based on the modified scores to produce a set of output entries; and
providing the set of output entries as a report.

10. The method of claim 9, wherein at least a portion of the set of entries is identified based on those entries that have modified scores above a desired threshold.

11. The method of claim 10, wherein the set of output entries include at least one business name blocked from at least one service.

12. The method of claim 11, wherein the service is a credit service.

13. A system including:
a processor;
a parser executable by the processor to receive a search query that includes an input search string, the input search string including a plurality of terms, to perform a first search technique to compare each of the plurality of terms to a list of category terms, to identify a matching term as a category term for each of the plurality of terms matching an item in the list of category terms, to perform a second search technique that includes generating a list of legal status terms based on the plurality of terms and comparing each of the plurality of terms to the list of legal status terms, to identify a matching term as a legal status term for each of the plurality of terms matching an item in the list of legal status terms, and to identify a non-matching term as a naming term for each of the plurality of terms not matching any item in the list of category terms or in the list of legal status terms;
category search logic executable by the processor to filter a plurality of business names based on at least one of each identified category term, legal status term, and naming term to produce a reduced set of business names; and
naming search logic executable by the processor to compare at least one identified naming term to the reduced set of business names to identify at least one matching business name.

14. The system of claim 13,
wherein the first search technique is different from the second search technique.

15. The system of claim 13, wherein the first search technique removes from a set of entries of a database any entries having a category that conflicts with a category term of the at least one matching business name.

16. The system of claim 13, wherein the second search technique includes selecting a numerical category indicator associated with a category term of the at least one matching business name and performing a comparison of the selected numerical category indicator with a numerical category indicator of a database entry of a database.

17. The system of claim 13, wherein the second search technique includes comparing each of the naming terms to each term of a stored business name of a database and generating a name comparison score for each of the naming terms.

18. The system of claim 13, wherein the second search technique includes adjusting a score that is associated with a similarity between the naming terms and terms of a stored business name of a database entry, wherein the score is adjusted based on comparing a legal status associated with the database entry with a legal status indicated by the legal status term.

19. The system of claim 13, wherein the parser includes legal status search logic to identify the legal status term.

20. A computer program product comprising a tangible computer usable medium including a computer readable program, wherein the computer readable program, when executed by a computer, causes the computer to:
receive a search query that includes the input search string, the input search string including a plurality of terms;.
perform a first search technique to compare each of the plurality of terms to a list of category terms;
for each of the plurality of terms matching an item in the list of category terms, identifying the matching term as a category term;
perform a second search technique to generate a list of legal status terms based on the plurality of terms and to compare each of the plurality of terms to the list of legal status terms;
for each of the plurality of terms matching an item in the list of legal status terms, identifying the matching term as a legal status term;
for each of the plurality of terms not matching any item in the list of category terms or in the list of legal status terms, identify the non-matching term as a naming term;
filter a plurality of business names based on at least one of each identified category term, legal status term, and naming term to produce a reduced set of business names.

21. The computer program product of claim 20, wherein the computer readable program, when further executed by the computer, causes the computer to:
compare at least one identified naming term to the reduced set of business names to identify at least one matching name, wherein the at least one matching name is not an address, phone number, postal code, location, area code, account number, or Standard Industry Classification (SIC) code.

22. The computer program product of claim 20, wherein the computer readable program, when further executed by the computer, causes the computer to:
filter a database based on each of the identified category terms to produce a set of entries, the set of entries associated with at least one of the identified category terms or having no category association; and
compare each identified naming term to each entry of the set of entries to generate a set of matching scores.

23. The computer program product of claim 22, wherein the computer readable program, when further executed by the computer, causes the computer to modify each score of the set of matching scores based on a comparison of each legal status term of the list of legal status terms to each entry of the set of entries to produce a set of modified scores.

24. The computer program product of claim 23, wherein the computer readable program, when further executed by the computer, causes the computer to:
identify at least a portion of the set of entries based on the modified scores to produce a set of output entries; and
provide the set of output entries as a report.

25. The method of claim 1, wherein the first search technique is different from the second search technique.

* * * * *